United States Patent [19]

Hinachi et al.

[11] 4,151,526
[45] Apr. 24, 1979

[54] OBSTACLE DETECTING RADAR APPARATUS FOR A MOTOR VEHICLE OR THE LIKE

[75] Inventors: Matatoyo Hinachi, Nagoya; Kiyoshi Miki, Okazaki, both of Japan

[73] Assignees: Nippon Soken, Inc., Nishio; Toyota Jidosha Kogyo Kabushiki Kaisha, Toyota, both of Japan

[21] Appl. No.: 805,143

[22] Filed: Jun. 9, 1977

[30] Foreign Application Priority Data

Jul. 8, 1976 [JP] Japan .................. 51-81213

[51] Int. Cl.$^2$ ............................................. G01S 9/04
[52] U.S. Cl. ............................... 343/7 VM; 180/98
[58] Field of Search ............... 343/7 VM; 180/98; 333/84 L

[56] References Cited

U.S. PATENT DOCUMENTS

| | | | |
|---|---|---|---|
| 3,159,826 | 12/1964 | Morrison | 180/98 X |
| 3,377,587 | 4/1968 | Nakahara et al. | 343/7 VM |
| 3,668,573 | 6/1972 | Martin | 333/84 L |
| 3,773,136 | 11/1973 | Palazzetti et al. | 180/98 |

Primary Examiner—T. H. Tubbesing
Attorney, Agent, or Firm—Cushman, Darby & Cushman

[57] ABSTRACT

A vehicle mounted obstacle detecting radar is disclosed. An electromagnetic wave radiated from the radar apparatus is received by a first antenna mounted on the ground and passed through a transmission line to a second antenna mounted on the ground and radiated thereby to a monitor area. A response electromagnetic wave from an obstacle within the monitor area is received by the second antenna and passed through the transmission line to the first antenna and received by the radar apparatus. When the transmission channel is arranged along a curved road, an obstacle in the curved road can be detected.

6 Claims, 8 Drawing Figures

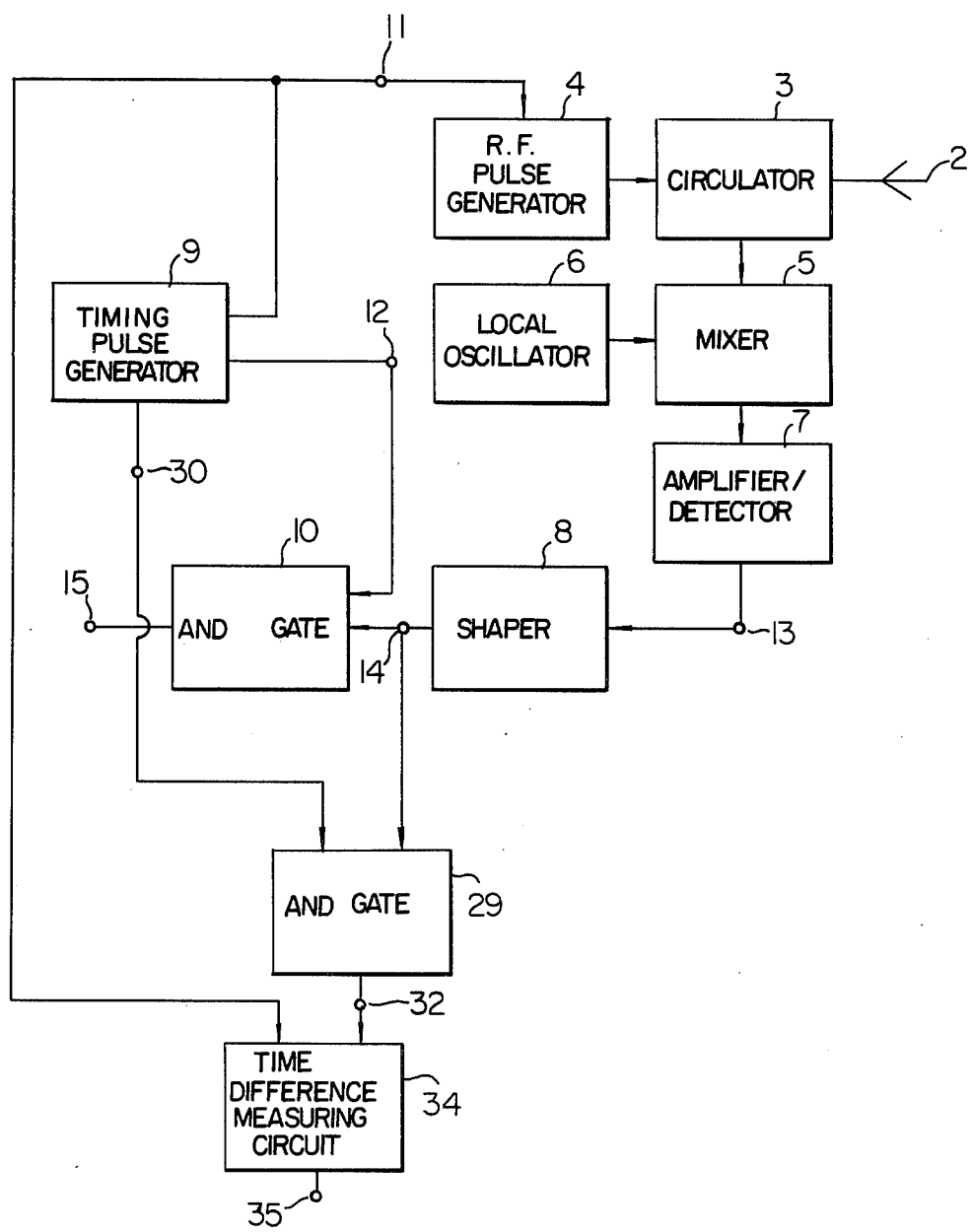

OBSTACLE DETECTING RADAR APPARATUS FOR A MOTOR VEHICLE OR THE LIKE

BACKGROUND OF THE INVENTION

The present invention relates to an obstacle detecting radar apparatus for a motor vehicle or the like for preventing collision accidents or the like.

Heretofore, an obstacle detecting system for detecting an obstacle forward of a vehicle by using a radar apparatus mounted on the vehicle has been proposed. In such systems the radar apparatus generally radiates an electromagnetic wave toward a monitor area forward of the vehicle and receives and analyzes a reflected wave from an obstacle.

However, in the prior art system, since the electromagnetic wave is radiated toward the monitor area forward of the vehicle and the reflected wave from the obstacle located in the monitor area is received, there is a big disadvantage that the electromagnetic wave is intercepted by a side object in a curved road so that it does not reach the monitor area.

SUMMARY OF THE INVENTION

It is an object of the present invention to provide an obstacle detecting radar for a motor vehicle or the like wherein an electromagnetic wave radiated from the vehicle is propagated from a first antenna mounted on the ground to a second antenna mounted on the ground spaced apart by a predetermined distance in a direction of travel of the vehicle, through a high frequency line, and the electromagnetic wave is radiated from the second antenna toward a monitor area and a reflected wave from the monitor area is received by the vehicle to detect an obstacle so that the obstacle can be detected even in a curved road or branching road.

DESCRIPTION OF THE DRAWINGS

FIG. 4 is a diagram illustrating a partial configuration of a second embodiment of the present invention.

FIG. 5 is a block diagram of a radar circuit in the second embodiment.

DESCRIPTION OF THE PREFERRED EMBODIMENTS

Figure 1:
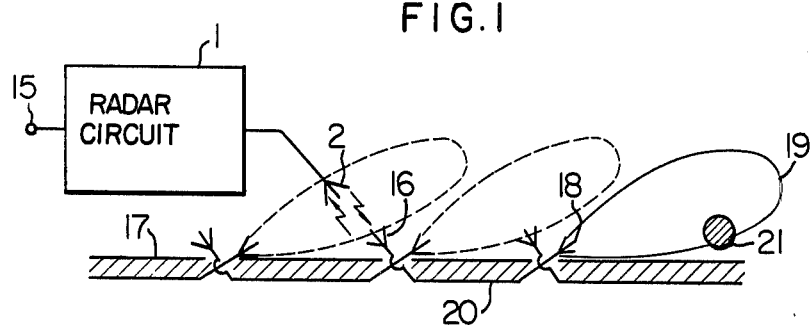
FIG. 1 is a diagram illustrating a general configuration of a first embodiment of the present invention.
Figure 2:
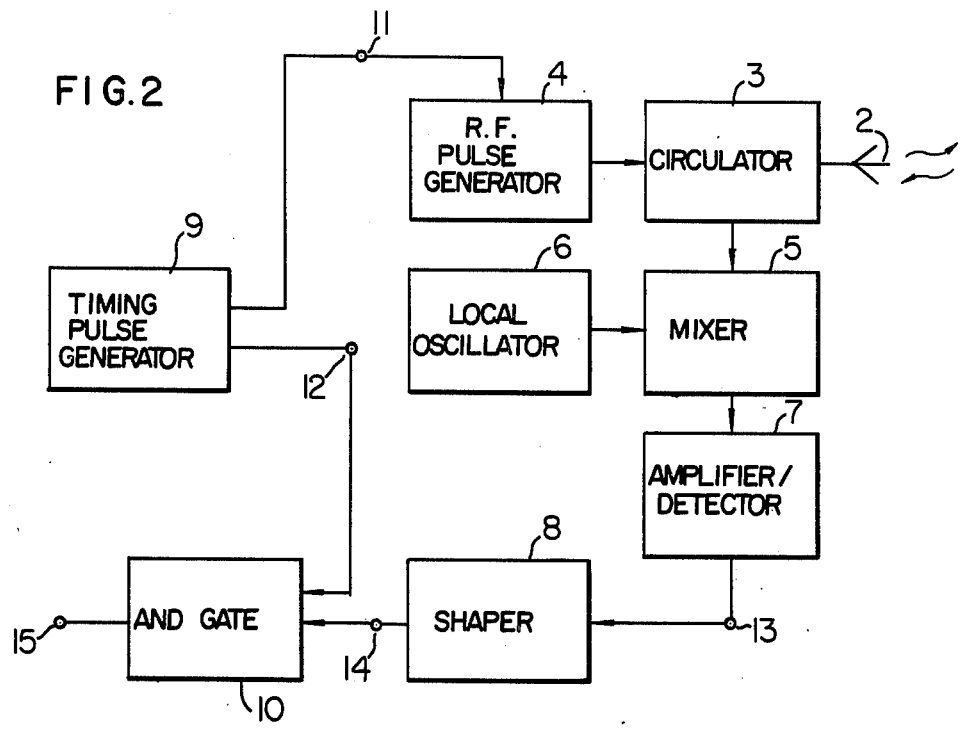
FIG. 2 is a block diagram illustrating an example of a vehicle mounted radar circuit.

The preferred embodiments of the present invention are explained below. Referring to FIG. 1 which illustrates a first embodiment, numeral 1 denotes a radar circuit mounted on a vehicle, not shown. Radar 1 is connected to a transmitting/receiving antenna 2 for transmitting/receiving electromagnetic waves and has an output terminal 15. Numeral 16 denotes a first antenna mounted on a road 17 such that it can be faced to the transmitting/receiving antenna 2, and numeral 18 denotes a second antenna having a directional pattern 19 mounted on the ground spaced apart by a predetermined distance from the first antenna 16 in the direction of the travel of the vehicle, that is, in the forward direction of the road 17, to establish a predetermined obstacle monitoring area. The first antenna 16 and the second antenna 18 are coupled through a high frequency line 20. Transmission line 20, as shown in FIG. 1, is suitably embedded in road 17. Numeral 21 denotes an obstacle on the road to be detected. The radar circuit 1 may be of known type, which may comprise, as shown in FIG. 2, a circulator 3, a radio frequency pulse generator 4, a mixer 5, a local oscillator 6, an amplifier/detector 7, a signal shaper 8, a timing pulse generator 9, and a logical AND gate 10.

Figure 3:
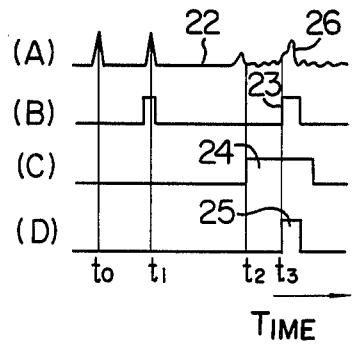
FIG. 3 shows waveforms for explaining the operation of the first embodiment.

The operation of the present embodiment thus constructed is now explained with reference to FIG. 3. The radio frequency pulse generator 4 is operated at a time $t_o$ by a signal appearing at an output terminal 11 of the timing pulse generator 9 and electromagnetic waves are radiated from the vehicle through the circulator 3 and the transmitting/receiving antenna 2. A repetition cycle of radiation of the electromagnetic waves is chosen to be sufficiently short relative to a time period during which the first and second antennas 16 and 18 can be faced to each other. Thus, each time the vehicle travels by a predetermined distance, the electromagnetic wave from the transmitting/receiving antenna 2 is received by the first antenna 16, propagated through the high frequency line 20 and radiated from the second antenna 18 toward the monitor area forward of the vehicle. If the obstacle 21 exists within the directional pattern 19, a reflected wave from the obstacle 21 is received by the second antenna 18, propagated through the high frequency line 20 and radiated from the first antenna 16 so that the reflected wave is received by the transmitting/receiving antenna 2. The received signal is applied through the circulator 3 to the mixer 5 where it is mixed with a signal from a local oscillator 6 and applied to the amplifier/detector 7 for amplification and detection.

As a result, as shown in FIG. 3(A), a signal 22 which includes a signal component 26 from the obstacle 21 is produced at a terminal 13 at a time $t_3$. This signal 22 is shaped by the shaper 8 to produce a signal 23 shown in FIG. 3(B) at a terminal 14. On the other hand, a signal 24 shown in FIG. 3(C) having a duration to define the distance of the obstacle monitor area is produced from the terminal 12 of the timing pulse generator 9 a predetermined time after the time $t_o$, for example after the time $t_2$ at which the echo signal from the second antenna 18 is received. When the obstacle 21 exists in the monitor area, the AND function of the signal 23 and the signal 24 is met so that the AND gate 10 produces a signal 25 shown in FIG. 3(D) at a terminal 15 indicating the presence of the obstacle 21. Thus, the echo signal from the first antenna 16 received at the time $t_1$ is blocked by the output signal 25 of the AND gate 10. The signal 25 can be used to drive a brake or indicator of the vehicle.

In the above embodiment, it should be understood that the duration of the signal 24 for defining the monitor area may be increased as the vehicle velocity increases so that the monitor distance can be increased as the vehicle velocity increases. Even if the road 17 is curved, the high frequency line 20 may be arranged along the curved road so that the obstacle 21 on the road not located forward of the vehicle can be detected.

Figure 6:
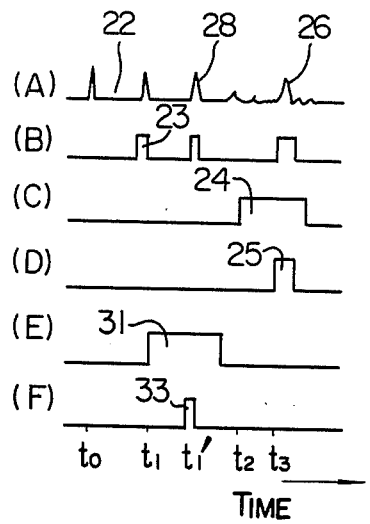
FIG. 6 shows waveforms for explaining the operation of the second embodiment.

A second embodiment of the present invention is now explained for those points which differ from the first embodiment. As shown in FIG. 4, a wave guide, suitably embedded in road 17, is used as the high frequency line 20 for connecting the first and second antennas 16 and 18 mounted on the road, and a reflector 27 is inserted in the high frequency line 20 at a point spaced from the first antenna 16 by a distance corresponding to an allowable speed of the vehicle. As shown in FIG. 5, the radar circuit 1 to be mounted on the vehicle includes an AND gate 29 and a time difference measuring circuit 34 in addition to the construction of the first embodiment so that an allowable speed signal of the vehicle for that particular road can be produced from a terminal 35. In operation, the electromagnetic wave radiated from the transmitting/receiving antenna 2 is received by the first antenna 16 while a portion thereof is radiated by the reflector 27 in the high frequency line 20. As a result, as shown in FIG. 6(A), the signal 22 which includes the signal 26 caused by the reflection by the obstacle 21 as well as a signal 28 caused at a time $t_1'$ by the reflection of the reflector 27 is produced. Like in the first embodiment, the signals shown in FIGS. 6(B), (C) and (D) are produced at the respective terminals 14, 12 and 15. The timing pulse generator 9 produces a signal 31 shown in FIG. 6(E) at the terminal 30 a predetermined time after the time $t_o$, that is, after the time $t_1$ at which the echo signal from the first antenna 16 is produced. Thus, the AND gate 29 produces a signal 33 shown in FIG. 6(F) at a terminal 32. The signal 33 is synchronized with the signal 28 shown in FIG. 6(A) produced by the reflector 27. Accordingly, by measuring the time period from the time $t_o$ at which the timing pulse generator 9 produces a signal commanding the radiation of the electromagnetic wave, to the time $t_1'$ at which the signal 33 is produced by the time difference measuring circuit 34, the allowable speed information for the vehicle at that point can be derived from the terminal 35.

While the second embodiment uses the wave guide as the high frequency line 20, a similar effect may be attained when a coaxial line or strip line is used with a known reflector being added. It should be understood that instead of representing the allowable speed information by the location of the reflector, the reflector may be in the form of a plurality of coded arrangement and a known encoding circuit is used instead of the time difference measuring circuit 34. Other information such as intersecting angle information of the direction of the vehicle travel and the monitor area may be included. Furthermore, a known diode switch may be used as the reflector such that the diode switch is externally actuated to allow external control of the information to be transmitted.

In the above embodiments, the construction of the radar circuit is not limited to the illustrated embodiment but any other construction such as a pulse doppler radar may be used, and various known technologies can be applicable in handling the signal.

Figure 7:
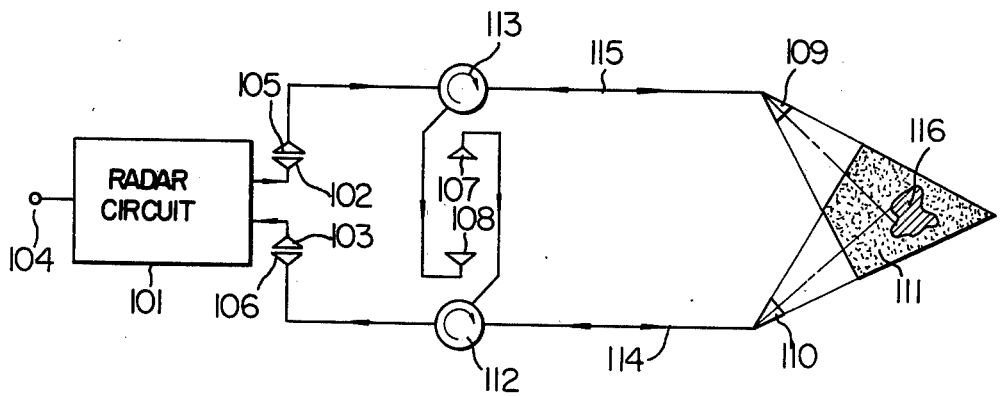
FIG. 7 is a diagram illustrating a general configuration of a third embodiment of the present invention.

Referring now to FIG. 7, another embodiment of the present invention is explained. In FIG. 7, numeral 101 denotes a known radar circuit mounted on a vehicle not shown, and it is connected to a transmitting antenna 102 for transmitting electromagnetic wave and a receiving antenna 103 for receiving electromagnetic wave and has an output terminal 104. Numeral 105 denotes a first receiving antenna mounted on a road such that it can be faced to the transmitting antenna 102, numeral 106 denotes a first transmitting antenna mounted on the road such that it can be faced to the receiving antenna 103, numeral 107 denotes a second receiving antenna which is located on the road and spaced from the first receiving antenna 105 by a predetermined distance in the direction of the vehicle travel, that is, in the direction of the extension of the road and which is mounted on the road such that it can be faced to the transmitting antenna 102 similarly to the first receiving antenna 105, numeral 108 denotes a second transmitting antenna mounted in a similar manner as the first transmitting antenna 106, numeral 109 denotes a third left antenna which is transmitting/receiving type having a directivity to establish a predetermined obstacle monitor area 111 and located on the road spaced from the second receiving antenna 107 by a predetermined distance in the direction of the vehicle travel, that is, in the direction of the extension of the road, numeral 110 denotes a third right antenna which is transmitting/receiving type and mounted similarly to the third left antenna 109, numeral 112 denotes a right circulator having a rotation direction to propagate a wave from the third right antenna 110 to the first transmitting antenna 106 and to propagate a wave from the second receiving antenna 107 to the third right antenna 110, numeral 113 denotes a left circulator having a rotation direction to propagate a wave from the third left antenna 109 to the second transmitting antenna 108 and to propagate a wave from the first receiving antenna 105 to the third left antenna 109, numeral 114 denotes a right high frequency line for connecting the right circulator 112 to the third right antenna 110, numeral 115 denotes a similar left high frequency line, and numeral 116 denotes an obstacle on the road to be detected.

The operation of this embodiment thus constructed is explained with reference to FIG. 7. As the vehicle runs and reaches a point at which the transmitting antenna 102 faces to the first receiving antenna 105 and the receiving antenna 103 faces to the first transmitting antenna 106, the wave from the radar circuit 101 is radiated through the transmitting antenna 102, the first receiving antenna 105, the left circulator 113, the left high frequency line 115 and the third left antenna 109 to the monitor area 111 forward of the vehicle. The reflected wave from the obstacle 116 is received by the third right antenna 110 and propagated through the right high frequency line 114, the right circulator 112, the first transmitting antenna 106 and the receiving antenna 103 to the radar circuit 101.

The radar circuit 101 analyzes the received wave by a known means and indicates the presence of the obstacle at the output terminal 104. As the vehicle further runs to reach a point at which the transmitting antenna 102 faces to the second receiving antenna 107 and the receiving antenna 103 faces the second transmitting antenna 108, the wave from the radar circuit 101 is radiated to the monitor area 111 through the second receiving antenna 107, the right circulator 112, the right high frequency line 114 and the third right antenna 110. The reflected wave from the obstacle 116 is received by the third left antenna 109 and propagated through the left high frequency line 115, the left circulator 113, the second transmitting antenna 108 and the receiving antenna 103 to the radar circuit 101 to indicate the presence of the obstacle at the output terminal 104. The output signal at the terminal 104 may be used to drive a brake or an indicator of the vehicle. When the road is curved so that one cannot see ahead, the third right antenna 110 and the third left antenna 109 are arranged at appropriate points and the right high frequency line 114 and the left high frequency line 115 are arranged at the curved area so that the obstacle can be detected to prevent collision accident.

Figure 8:
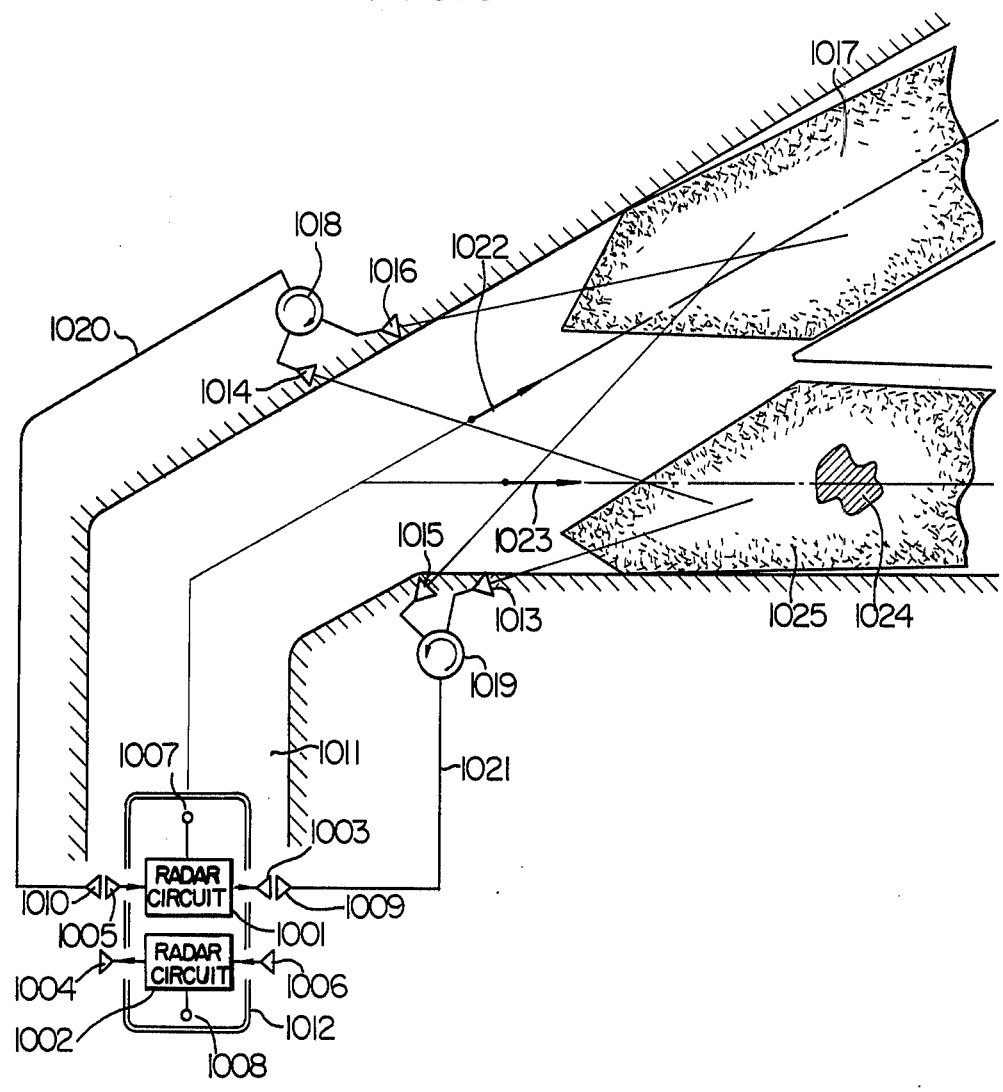
FIG. 8 is a diagram illustrating a general configuration of a fourth embodiment of the present invention.

Referring now to FIG. 8, still another embodiment of the present invention is explained. In FIG. 8, numerals 1001 and 1002 denote radar circuits mounted on a vehicle 1012, which are connected to transmitting antennas 1003 and 1004 and receiving antennas 1005 and 1006 for transmitting and receiving electromagnetic waves, and to output terminals 1007 and 1008, respectively. Numerals 1009 and 1010 denote first right antenna and first left antenna located on a road 1011 and mounted such that they can be simultaneously faced to the transmitting antenna 1003 and the receiving antenna 1005, respectively, numerals 1013 and 1014 denote second right antenna and second left antenna which are located on the road at points spaced from the first right antenna 1009 and the first left antenna 1010, respectively, by predetermined distances in the direction of the vehicle travel, that is, in the direction of the extension of the road and which have directivities for defining a first obstacle monitor area 1025, numerals 1015 and 1016 denote third right antenna and third left antenna which are located on the road 1011 in a similar way and which have directivities to define a second obstacle monitor area 1017, numeral 1021 denotes a right high frequency line connected to the first right antenna 1009, numeral 1019 denotes a right circulator having a rotation direction to propagate a wave from the right high frequency line 1021 to the second right antenna 1013, and it is connected to the right high frequency line 1021, the second right antenna 1013 and the third right antenna 1015. Numeral 1020 denotes a left high frequency line connected to the first left antenna 1010, numeral 1018 denotes a left circulator having a rotation direction to propagate a wave from the second left antenna 1014 to the left high frequency line 1020, and it is connected to the left high frequency line 1020, the second left antenna 1014 and the third left antenna 1016. Numerals 1023 and 1022 denote first travel path and second travel path of the vehicle, and numeral 1024 denotes an obstacle which is to be detected when the vehicle 1012 runs along the first travel path 1023. Antennas 1013, 1014, 1015 and 1016 are, as depicted in FIG. 8, suitably mounted respectively at a forward and rearward (beginning and end) of a curve or intersection, such that monitor areas 1025 and 1017 are respectively located along the respective travel paths 1023 and 1022 of the intersection.

The operation of this embodiment thus constructed is now explained with reference to FIG. 8. As the vehicle 1012 runs on the road 1011 to reach a point at which the transmitting antenna 1003 faces to the first right antenna 1009 and the receiving antenna 1005 faces to the first left antenna 1010, the wave from the radar circuit 1001 is radiated to the first monitor area 1025 on the first travel path 1023 through the transmitting antenna 1003, the first right antenna 1009, the right high frequency line 1021, the right circulator 1019 and the second right antenna 1013. The reflected wave from the obstacle 1024 is received by the second left antenna 1014 and propagated through the left circulator 1018, the left high frequency line 1020, the first left antenna 1010 and the receiving antenna 1005. The radar circuit 1001 analyzes the received wave by a known means to indicate the presence of the obstacle 1024 at the output terminal 1007. As the vehicle 1012 further runs to reach a point at which the transmitting antenna 1004 faces to the first left antenna 1010 and the receiving antenna 1006 faces to the first right antenna 1009, the wave from the radar circuit 1002 is radiated to the second monitor area 1017 on the second travel path 1022 through the transmitting antenna 1004, the first left antenna 1010, the left high frequency line 1020, the left circulator 1018 and the third left antenna 1016. If an obstacle (not shown) exists in the second monitor area 1017, the resulting reflected wave is received by the third right antenna 1015 and propagated through the right circulator 1019, the right high frequency line 1021, the first right antenna 1009 and the receiving antenna 1006. The radar circuit 1002 also analyzes the received wave by a known means to indicate the presence of the obstacle at the output terminal 1008. The signals at the outputs 1007 and 1008 can be used to drive a brake or an indicator of the vehicle. When the road is curved such that one cannot see ahead, the second antennas 1013 and 1014 are located at appropriate points while the high frequency lines 1020 and 1021 are arranged along the curved road so that the obstacle 1024 can be detected to prevent collision accidents.

What is claimed is:

1. An obstacle detecting system for motor vehicles comprising:
   first antenna means, located on a vehicle running road, for receiving and radiating an electromagnetic wave;
   second antenna means, located on said vehicle running road and spaced apart from said first antenna means, for receiving and radiating said electromagnetic wave;
   transmission line means, provided to connect said first and second antenna means and disposed having at least a portion thereof embedded in said vehicle running road for transmitting said electromagnetic wave therethrough;
   a reflector, coupled to said transmission line means at a predetermined distance spaced from said first antenna means, for reflecting some part of said electromagnetic wave transmitted from said first antenna means to said second antenna means;
   radar circuit means, carried by the motor vehicle, for radiating said electromagnetic wave which is received by said first antenna means and radiated by said second antenna means into a space and receiving said electromagnetic wave which is reflected by an obstacle in said space, received by said second antenna means and radiated by said first antenna means, whereby said radar circuit means detect said obstacle upon receipt of said electromagnetic wave reflected by said obstacle; and
   time measuring means, connected to said radar circuit means, for measuring the time interval between the radiation of said electromagnetic wave from said radar circuit means and the receipt of said electromagnetic wave reflected by said reflector.

2. An obstacle detecting system according to claim 1, wherein said transmission line means includes:
   a wave guide tube having one end connected to said first antenna means and the other end connected to said second antenna means.

3. An obstacle detecting system according to claim 1, wherein said radar circuit means comprises:
   timing pulse generator circuit means for generating clock pulse signal;
   radio frequency pulse wave generator circuit means connected to said timing pulse generator circuit means, for generating pulse wave in response to the generation of said clock pulse signal;

circulator means connected to said radio frequency pulse wave generator circuit means, for radiating said pulse wave into said space;

local oscillator circuit means for generating a high frequency wave;

mixer circuit means connected to both said circulator means and said local oscillator circuit means, for mixing a received reply pulse wave with said high frequency wave;

amplifier and detector circuit means connected to said mixer means, for amplifying and detecting said reply pulse wave to produce a reply pulse signal;

signal shaper circuit means connected to said amplifier and detector circuit means, for shaping said reply pulse signal; and AND circuit means having two inputs, one of which is connected to said signal shaper circuit means and the other is connected to said timing pulse generator circuit means, for passing said reply pulse signal from said signal shaper circuit means in accordance with a control signal generated by said timing pulse generator circuit means.

4. An obstacle detecting system for motor vehicles comprising:

radar circuit means having a transmitting antenna and a receiving antenna;

a first reception antenna for receiving the electromagnetic wave transmitted from said transmitting antenna;

a first circulator to direct the electromagnetic wave received by said first reception antenna;

a first transmission line for propagating the electromagnetic wave directed by said first circulator;

a first transmission/reception antenna for radiating to an obstacle the electromagnetic wave propagated through said first transmission line;

a second transmission/reception antenna for receiving the reflected wave from the obstacle;

a second transmission line for propagating the reflected wave received by said second transmission/reception antenna;

a second circulator to direct the reflected wave propagaged through said second transmission line;

a first transmission antenna for transmitting the reflected wave directed by said second circulator to the receiving antenna of said radar circuit means;

a second reception antenna coupled to said second circulator for receiving the electromagnetic wave from the transmitting antenna of said radar circuit means; and a second transmission antenna coupled to said first circulator for transmitting the reflected wave to the receiving antenna of said radar circuit means.

5. The system of claim 4 wherein said first transmission and first reception antennas and said second transmission and second reception antennas are disposed such that said first and second obstacle monitor areas are disposed along respective alternate travel paths.

6. An obstacle detecting system for motor vehicles comprising:

first radar circuit means having a first transmitting antenna and a first receiving antenna;

a first reception/transmission antenna disposed for receiving the electromagnetic wave from said first transmitting antenna;

a first transmission line to propagate the electromagnetic wave received by said first reception antenna;

a first circulator coupled to said first transmission line;

a first transmission antenna coupled to said first circulator for radiating the electromagnetic wave directed by said first circulator to a first obstacle monitor area;

a first reception antenna for receiving the reflected wave from said first obstacle monitor area;

a second circulator to direct the reflected wave received by said first reception antenna;

a second transmission line coupled to said second circulator to propagate the reflected wave directed by said second circulator;

a second transmission/reception antenna for transmitting the reflected wave propagated through said second transmission line to the first receiving antenna of said first radar circuit means;

second radar circuit means having a second transmitting antenna and a second receiving antenna, said second transmitting antenna being disposed to transmit an electromagnetic wave to said second transmission/reception antenna, the electromagnetic wave received being propagated through said second transmission line to said second circulator;

a second transmission antenna, coupled to said second circulator for radiating to a second obstacle monitor area the electromagnetic wave from said second radar circuit means; and a second reception antenna, coupled to said first circulator for receiving the reflected wave from said second obstacle monitor area, the reflected wave received being directed by said first circulator and propagated through said first transmission line and in turn transmitted by said first reception/transmission antenna to the second receiving antenna of said second radar circuit means.

* * * * *